Jan. 11, 1927.　　　　　　　　　　　　　　　　　　1,614,024
H. H. ALLYN ET AL
METHOD OF TREATING AUTOMOBILE TIRES AND PRODUCTS RESULTING THEREFROM
Original Filed Feb. 7, 1918　　2 Sheets-Sheet 1
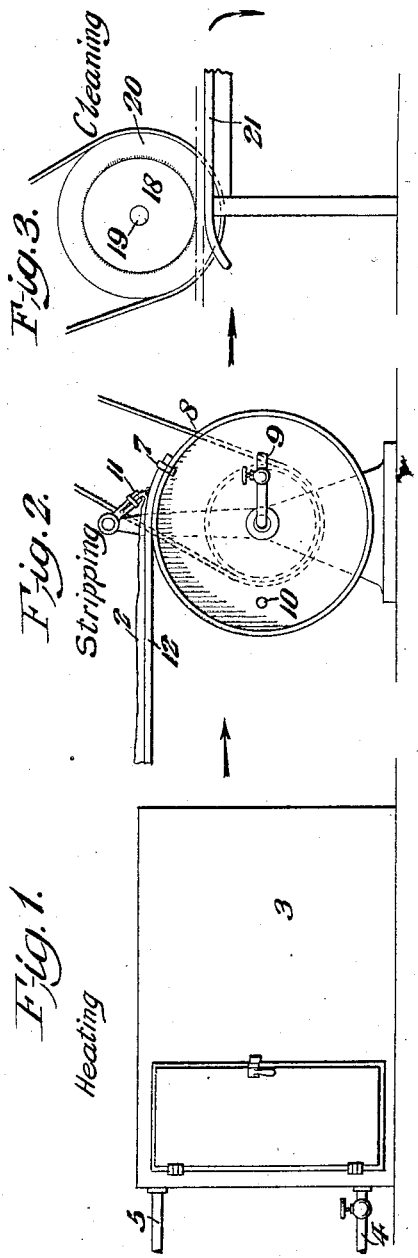
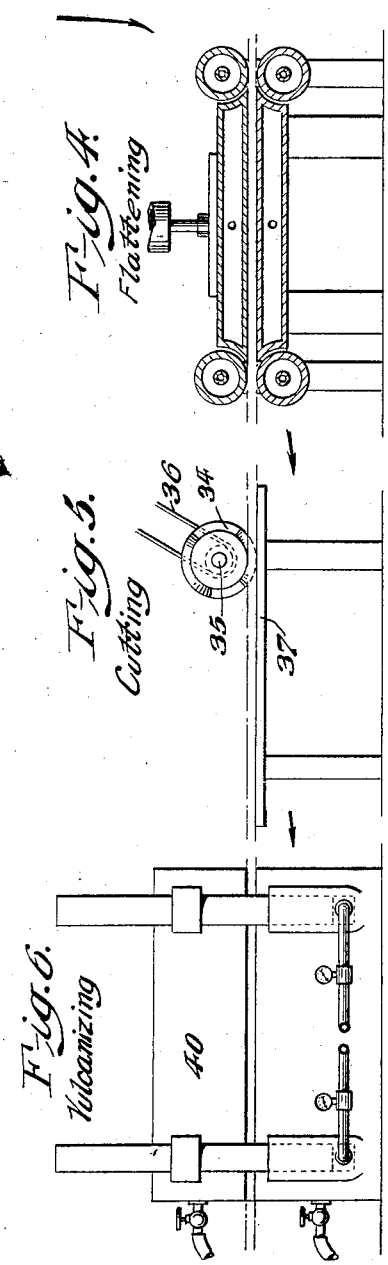
WITNESSES:
INVENTORS:
ATTORNEYS:

Jan. 11, 1927. 1,614,024
H. H. ALLYN ET AL
METHOD OF TREATING AUTOMOBILE TIRES AND PRODUCTS RESULTING THEREFROM
Original Filed Feb. 7, 1918 2 Sheets-Sheet 2
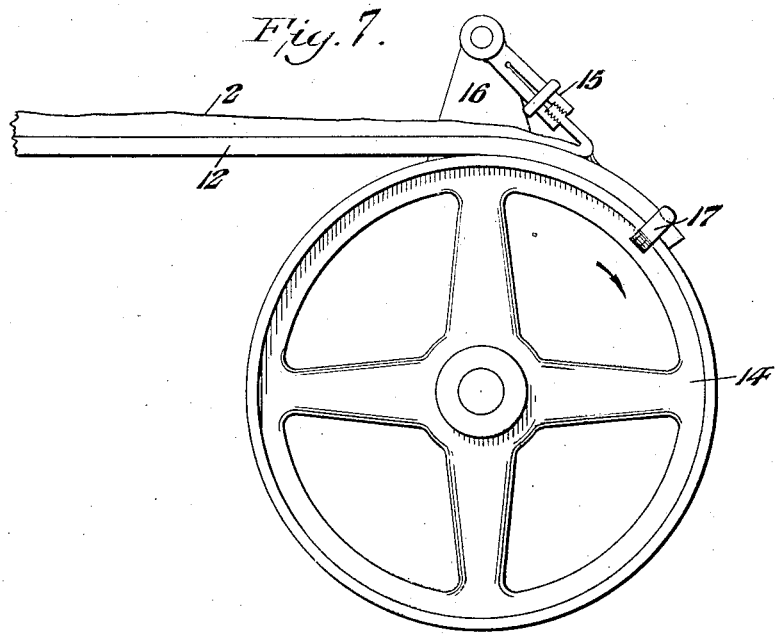
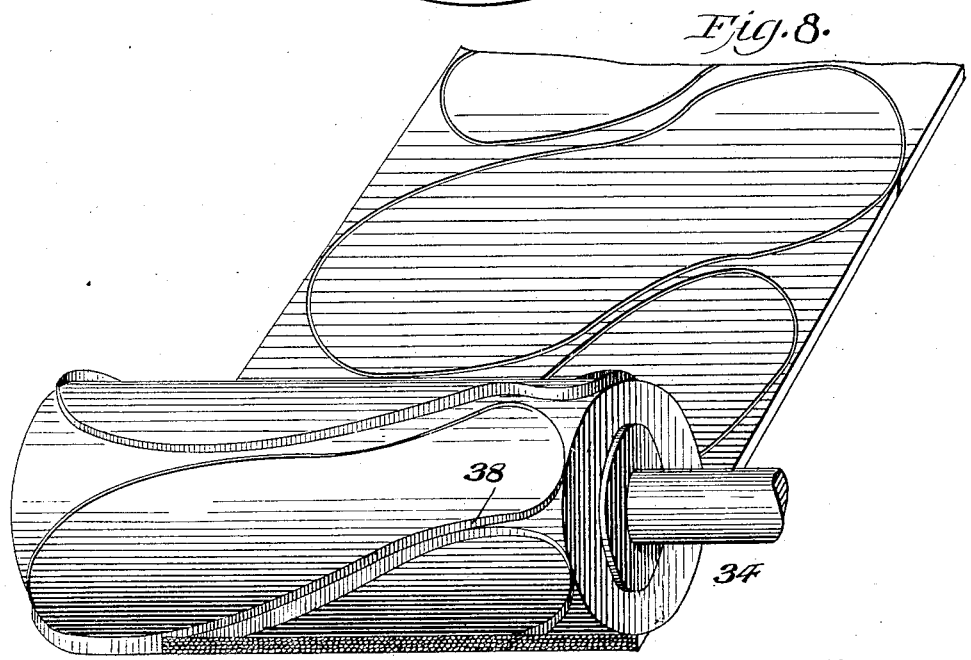

Patented Jan. 11, 1927.

1,614,024

UNITED STATES PATENT OFFICE.

HARLEY H. ALLYN, OF NORWICH, CONNECTICUT, AND JOSEPH S. WILLIAMS, OF WALLINGFORD, PENNSYLVANIA; SAID ALLYN ASSIGNOR TO SAID WILLIAMS.

METHOD OF TREATING AUTOMOBILE TIRES AND PRODUCTS RESULTING THEREFROM.

Application filed February 7, 1918, Serial No. 215,788. Renewed March 31, 1926.

The object of our present invention is to utilize the tire carcasses of worn-out automobile tires and treat them in such a manner as to produce new and valuable products which are adapted for a variety of uses.

In the methods heretofore employed, the worn-out and discarded automobile tires are ground up and subjected to an acid treatment in order to remove the fabric, and thereafter the acid is washed out and the rubber reclaimed in the well-known manner, the result of which is that the fabric in the tire carcass, which is of an unusually high grade, is not available for any useful purpose.

In accordance with our present invention, substantially all of the parts of the tire are available for future use.

With the above in view, our invention consists of a novel method of treating worn-out automobile tires or similar products.

It further consists of a novel method of treating tire carcasses, wherein the outer layers of rubber are first removed. The outer face of the carcass is then brushed or buffed off in order to clean and roughen the surface so that the rubber to be applied will more readily adhere thereto. The plies of fabric and rubber are then subjected to heat and pressure, and the blanks are then cut from a sheet of material thus formed, the form of the blank depending upon the use to which it is to be put.

In case a sole is to be made, the blank is dipped in cement, a layer of rubber composition is applied to one side and it is then placed in a mold and subjected to heat and pressure. The portion of the tire carcass which is of too small dimensions to form the desired blank is ground up and treated with acid to remove the fabric and the material is then washed and the rubber reclaimed in the usual manner.

Our invention further consists of a novel product arising from the steps of our novel method, such product being adapted for a great variety of uses, such as for example, the soles and heels of shoes, packing, gaskets, and other devices too numerous to specifically mention.

Other novel features will hereinafter more clearly appear in the detailed description and the appended claims.

For the purpose of illustrating one manner of carrying out our invention in practice, we have shown in the accompanying drawings, typical embodiments of constructions which may be employed, but it is of course to be understood that such illustrations are typical only, and that our invention may be carried out in practice by means of any desired mechanism.

Figure 1 represents diagrammatically a heating receptacle into which the tires are first placed.

Figure 2 represents diagrammatically a side elevation of a stripping mechanism.

Figure 3 represents diagrammatically a side elevation of a cleaning device.

Figure 4 represents diagrammatically a sectional elevation of a flattening device.

Figure 5 represents diagrammatically a side elevation of a cutting mechanism.

Figure 6 represents diagrammatically a side elevation of a vulcanizing device.

Figure 7 represents diagrammatically and in side elevation another type of stripping mechanism which may be employed.

Figure 8 represents diagrammatically a perspective view of a die and the blank from which the soles are to be cut.

Similar numerals of reference indicate corresponding parts in the figures.

Referring to the drawings:—

In carrying out our invention, we take a tire carcass, and the outer layer of rubber 2 is first removed. In order to facilitate this removal, the tire carcasses are first placed in a heating receptacle 3, see Figure 1, which may be heated in any desired manner, but preferably by means of steam introduced through the inlet pipe 4, which is controlled in any desired manner, and the steam is discharged from the receptacle 3 through the discharge pipe 5. The outer layer of rubber 2 may be removed in any desired manner, but this is preferably accomplished by first starting the removal of the outer layer 6 and then clamping the end of the tire at 7 to the drum 8, which is provided wtih any desired means for effecting its rotation. This drum 8, if desired, may be provided with a steam inlet pipe 9 and a discharge port 10, so that the tire carcass may be maintained at a desired temperature during the stripping operation.

The free end of the outer layer 2 of the rubber is held stationary by the clamping jaw 11, so that during the revolution of the drum 8, the outer layer of rubber 2 is removed from the body or fabric portion 12 of the tire carcass. If the layers of fabric 12 have a sufficient number of plies in them, the body portion may be split or the entire bead or terminal portion of the tire carcass may be first removed.

In Figure 7 we have illustrated a drum 14 which is not provided with any means for heating it. 15 designates a clamping device of any desired or conventional type which is carried by a stationary support 16 and the drum 14 is provided with clamping means 17 for securing the carcass to the drum 14.

After the tread portion has been removed from the carcass 12, the remaining portion of the carcass is brushed or buffed off in order to roughen the surface of the carcass so that the rubber to be applied will more readily adhere. A conventional type of such mechanism is illustrated in Figure 3 in which 18 designates a buffing or cleaning wheel which is mounted on a shaft 19 on which is also mounted a pulley 20 which is driven by means of a belt actuated by any desired source of power. 21 designates a table over which the carcass is passed. The carcass is now heated and flattened out by passing it between plates and subjecting it to pressure, as will be understood by reference to Figure 4. The upper pressure rolls are adapted to be driven by a belt and the lower pressure rolls are also adapted to be driven by a belt. Provision is made for heating these rolls, and all of these rolls are provided with an inlet for the heating medium and an outlet. The upper and lower pressure plates are provided, each of which are chambered, and means are provided to maintain a desired temperature within such chambers. Each chamber is provided with an inlet and an outlet for a temperature changing medium, and these can be controlled in any desired manner. The carcass is now in a flat condition and is ready to be formed into blanks and passes from the flattening machine to the cutting machine seen in Figure 5.

34 designates a die carried by a roller 35 which is adapted to be driven by a belt 36. 37 designates a table to receive the carcasses. In Figure 8, the die 34, is shown as having its periphery provided with cutting members 38 having the contour of a shoe sole.

It will now be apparent from the foregoing that in carrying out the steps of our method we first start preferably at the bead and remove the outer layer of rubber, such as for example, the tread portion, and in some cases it is advisable to subject the carcass to heat, in order to facilitate the removal of the outer layer of rubber. It is also sometimes desirable to first remove the beads of the tire of the carcass. If the carcass is provided with a sufficient number of plies, it may be split into any desired number of layers depending upon the thickness of the carcass. The carcass is then brushed off in order to clean its outer face and to rough the surface so that the rubber to be applied will more readily adhere to the carcass. The carcass is then subjected to heat and pressure in order to flatten it out. The desired form of blanks are then cut out and such blanks are then preferably dipped in cement and a layer of rubber compound applied to one or both sides and also to the edges if desired. The blanks are then placed in molds and subjected to heat and pressure in order to vulcanize the rubber compounds of the blank. The material which is left after cutting out the blanks and the portions of the carcass such as cannot be used for blanks is then subjected to the ordinary reclaiming process in order to recover the rubber.

As is well known to those skilled in this art, a very high grade fabric is employed in the making of tires and the expense of such fabric in the making of articles like shoe soles or heels is prohibitory unless such fabric can be obtained from a by-product. It has been found in practice that soles made of worn out tire carcasses are more flexible than the ordinary rubber or leather sole and they will stand a greater amount of wear than the rubber or leather soles now in use. They are also lighter in weight than the ordinary leather sole.

It will be apparent from the foregoing that we have devised a novel method of treating tire carcasses which embodies the features of advantage enumerated in the statement of the invention and the foregoing description, and while we have, in the present instance, illustrated certain constructions for carrying out our invention in practice, it is to be understood that the mechanisms employed may vary widely in practice and that a number of the steps herein set forth may be omitted without departing from the spirit or scope or our invention.

Having thus described our invention, what we claim as new and desire to secure by Letters Patent, is:—

1. The method of treating tire carcasses, which consists in subjecting the tire carcasses to heat, removing the tread portion, subjecting the carcass to heat and pressure to flatten it, cutting out blanks from the remaining portion, applying rubber compound to the blanks, and then vulcanizing.

2. The method of treating tire carcasses, which consists in heating the tire to soften the rubber, removing an outer layer of rubber by stripping it from the fabric in the direction of the length of the carcass, roughening the surface of the carcass, subjecting it to heat and pressure, flattening the carcass, forming blanks from the carcass in the form of the article to be produced, applying cement to the blanks, applying rubber over the cement, and then placing such blanks in a mold and subjecting them to heat and pressure to complete the articles.

HARLEY H. ALLYN.
JOSEPH S. WILLIAMS.